March 9, 1954 G. D. PERKINS 2,671,895
AUTOMATIC BEACON RANGE INDICATOR
Filed Feb. 15, 1946

INVENTOR.
GEORGE D. PERKINS
BY
ATTORNEY

Patented Mar. 9, 1954

2,671,895

UNITED STATES PATENT OFFICE 2,671,895

AUTOMATIC BEACON RANGE INDICATOR

George D. Perkins, Salem, Mass., assignor, by mesne assignments, to the United States of America as represented by the Secretary of the Navy Application February 15, 1946, Serial No. 647,957

10 Claims. (Cl. 343—6.5)

This invention relates to radio ranging devices and more particularly to such devices for automatically indicating the range to a selected station.

An aircraft pilot often desires range information with respect to a ground station of known location. A conventional method for providing such data involves the use of a challenging radar set in the plane to trigger a transpondor beacon on the ground. When triggered by a pulse from the radar transmitter, the transpondor beacon sends back a series of pulses which are coded in time, the first of these pulse signals appearing on the radar indicator at the range of the beacon and the other pulses in the series appearing at longer ranges with spacings determined by the particular code used. Another type of transpondor beacon replies pulse for pulse to the radar transmitter except for predetermined gaps in the replies which constitute a coding system. Here the beacon signal appears on the radar indicator as a continuous signal at the range between plane and beacon, except for the coding gaps in the signal. Both types of presentation require concentration and some degree of skill on the part of the operator to identify the proper beacon as well as to read the range, and are particularly impractical for use in a single seater plane.

The present invention simplifies matters for the pilot by permitting him to turn a selector switch to a position corresponding to the coding of the particular beacon on which he wishes to "home." His apparatus then automatically locks on the beacon and gives him a visual indication on a meter of the range to the desired beacon.

An object of this invention is to provide an electronic automatic indicator of the range between an aircraft and a beacon.

Another object is to provide an electronic automatic indicator of the identity of a selected beacon.

Another object is to provide an automatic range indicator system to enable an aircraft to track a chain of beacon stations from the takeoff point to its destination.

These and other objects and features of this invention will become apparent upon consideration of the following detailed description when taken together with the accompanying drawings, in which.

Figure 1:
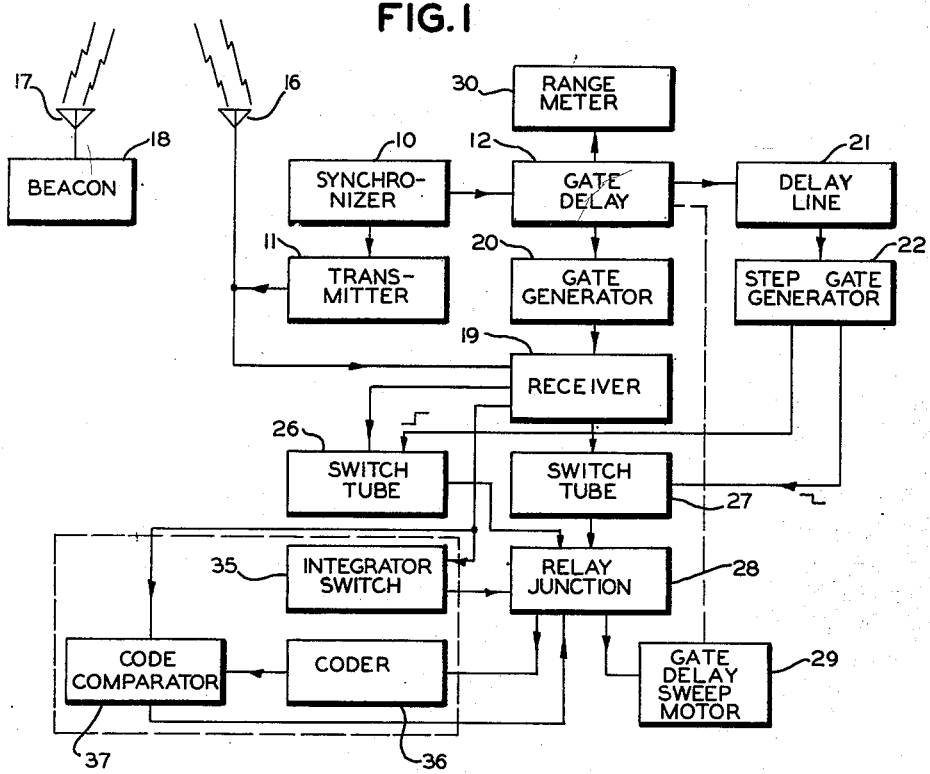
Fig. 1 is a block diagram of an automatic range indicator.

In Fig. 1, unit 10 is a synchronizer which triggers transmitter 11 and gate delay unit 12. Transmitter 11 sends out pulses of electromagnetic energy through antenna 16 at a predetermined repetition rate. The radiation from antenna 16, which with its associated equipment is considered to be mounted in an aircraft, is received by antenna 17 of beacon unit 18, which is a ground station remote from the aircraft. Each pulse of interrogating transmitter 11 is therefore received by beacon 18 and triggers off a component transmitter of beacon 18, sending back a reply signal pulse for each pulse of interrogation. However, after 15 or 30 seconds of replying pulse for pulse, there is a gap in beacon 18's transmission followed by a coded reply sequence of pulses constituting a Morse code letter identification of the beacon. This is a type of beacon in common use.

The reply signals from beacon 18 are picked up by antenna 16 and applied to receiver 19. Receiver 19 is normally blocked "off." However, when synchronizer 10 fires transmitter 11, it also pulses gate delay unit 12. Gate delay unit 12 includes a potentiometer whose slider contact controls the interval of delay between the pulse received from synchronizer 10 and the output pulse from unit 12. The output delayed pulse from gate delay unit 12 triggers gate generator 20. By the term gate as used here and hereinafter in this specification is meant a voltage pulse used for gating or otherwise activating a succeeding circuit. The gate output of unit 20 sensitizes receiver 19 for a predetermined time set by the gate length. It will be noted that gate delay unit 12 thus controls the interval between the firing of transmitter 11 and the sensitizing of receiver 19.

At the same time that the output pulse from gate delay unit 12 triggers gate generator 20, it is applied to delay line 21 which has a delay time of half the predetermined length of the gate output of unit 20. The output pulse from delay line 21 triggers step gate generator 22, producing two phase-opposed step gates. The positive step gate is applied to switch tube 26 and the negative step gate to switch tube 27. Positive video pulses of reply signals from beacon 18 are also supplied to switch tubes 26 and 27 by receiver 19. The switch tubes 26 and 27 can be of several types and the switching action can be accomplished in various ways. For purposes of illustration, switch tubes 26 and 27 will be considered to be thyratrons. The positive video pulses from receiver 19 are applied to the thyratron grids and the step gates from unit 22 are applied to the cathodes of the thyratrons. Thus, switch tube 26 will be conditioned to conduct in the time preceding the step in the middle of the gate. Switch tube 27 will be rendered non-conducting during the same time because the high voltage on its cathode will not permit the plate to cathode voltage to reach a firing potential. Similarly after the step occurs in the step gates from unit 22, switch tube 26 will be rendered non-conducting and switch tube 27 will be conditioned to conduct upon a positive trigger applied to its grid. Let gate delay unit 12 set the interval between a first interrogating pulse of transmitter 11 and the activating of receiver 19 such that the first reply signal received from beacon 18 occurs in the first half of the enabling gate generated by unit 20. Then switch tube 26 will be triggered by the first video reply pulse from receiver 19 and will conduct. The triggering of switch tube 26 closes a first relay in relay junction 28 which in turn closes a power supply circuit to gate delay sweep motor 29. Switch tube 26 stops conducting when the step in the positive step gate is reached and jumps the cathode potential to drop the plate to cathode voltage below the extinction potential. During the time switch tube 26 is conducting, motor 29 drives the slider arm of the potentiometer of gate delay unit 12 so as to decrease the interval between the second firing of transmitter 11 and activating of receiver 19. This process has the effect of moving the step gate outputs from unit 22 relative to the second reply video pulse of beacon 18 from receiver 19 so that the step moves to coincide with the video pulse. In like fashion, if the reply signal received from beacon 18 occurs in the second half of the activating gate generated by unit 20, switch tube 27 conducts, closing a second relay in relay junction 28 and causing motor 29 to run in reverse. In other words, switch tubes 26 and 27 generate error signals when the beacon reply signals are displaced from the center of the activating gate from unit 20, causing the controlled interval of gate delay unit 12 to be varied in order to place the reply signals in the center of the activating gate. In the absence of a reply signal during the period of activating of receiver 19, a relay in relay junction 28 is closed, causing motor 29 to operate and change the gate delay of unit 12 in what may be likened to a sweeping process in search for a signal. A point of equilibrium is reached when the step of the step gate outputs from unit 22 coincides with the video pulse from receiver 19. Then the position of the slider arm of the control potentiometer of gate delay unit 12 is proportional to the range between the interrogating transmitter 11 and the ground beacon 18. A range meter 30 comprises a voltmeter, calibrated in range units, connected across the above-mentioned potentiometer.

Figure 2:
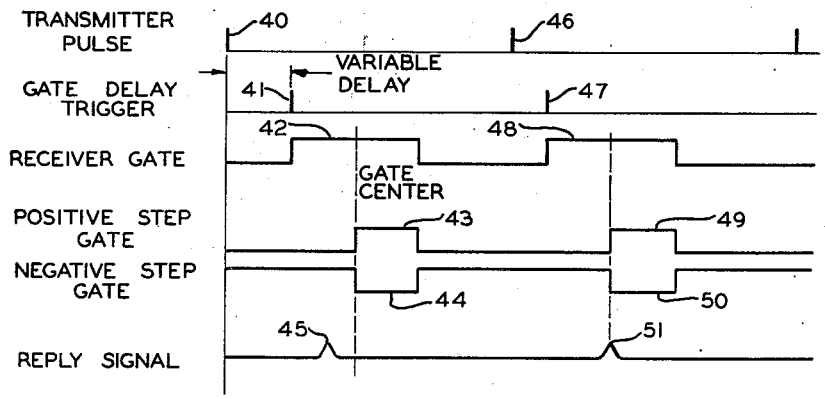
Fig. 2 illustrates the time relationship of operation of the units of Fig. 1.

By reference to Fig. 2 the time relationship between the trigger and gates of the units of Fig. 1 will be seen and the operation of this automatic range indicator more readily understood. Pulse 40 represents the first output pulse of transmitter 11 coincident with that of synchronizer 11. Trigger 41 is the first output pulse of gate delay unit 12 coming at a variable controlled interval after transmitter pulse 40. The output of gate generator 20 is receiver gate 42 and this starts coincident with trigger 41. Step gate generator 22 produces positive step gate 43 and negative step 44 having a step coinciding with the center of gate 42 as shown by the dotted vertical line. The first beacon reply signal 45 is shown preceding the center of gate 42 and the step of step gates 43 and 44. Therefore switch tube 26 would fire causing gate delay sweep motor 29 to decrease the delay time of unit 12. The second pulse 46 of transmitter 11 is followed by trigger 47 of gate delay unit 12, the time between 46 and 47 being shorter than the time between 40 and 41. This has the effect of moving gates 48, 49 and 50 to the left with respect to the second beacon reply signal 51 which follows transmitter pulse 46 by substantially the same interval as reply signal 45 followed interrogating pulse 40. Reply signal 51 is shown as coinciding with the center of receiver gate 48 in which case the equilibrium point referred to above is reached. As the range between interrogater and beacon changes and the beacon reply pulse tends to drift from the center of the receiver gate, gate delay sweep motor 29 will be energized and automatically vary the delay provided by unit 12 to keep the beacon reply signals centered in the receiver gate.

Thus the illustrative embodiment of this invention registers automatically the range between an aircraft and a ground beacon or between any station equipped with interrogating equipment and any station equipped with beacon equipment according to this invention. It will be readily apparent to those skilled in the art that the component units of this invention may have alternative forms. For instance, switch tubes 26 and 27 alternatively can take the form of coincidence amplifiers requiring simultaneous signals on control and screen grids for triggering. The step gate generator 22 as a one-shot or a driven multivibrator very simply provides phase-opposed step gates taken from the plates or cathodes respectively of both stages. Similarly units 12 and 20 could take the form of conventional multivibrators designed for the functions concerned.

In addition to providing range data to a beacon station, this invention provides for automatic selection of a desired beacon to which range information is sought. During the time in which beacon 18 is sending back a reply pulse for each pulse of transmitter 11, integrator switch unit 35 integrates each output video pulse from receiver 19 to maintain a voltage level above that required to keep a coder relay closed in relay junction 28. When the gap occurs in the pulse for pulse transmission of beacon 18 to be followed by the Morse code identification pulses, the voltage output from the integrating circuit of unit 35 decays and allows the coder relay to drop out. This sets coder 36 into operation to key a locally generated code corresponding to that of the beacon which the pilot desires to locate. A convenient form of coder is a motor driven disc properly segmented to key a desired Morse code signal. A selector switch incorporated in coder 36 permits selection of any one of a plurality of codes corresponding to a plurality of beacon stations. The coded pulse output of coder 36 is applied to code comparator 37 where it is compared to the coded pulse output of beacon 18 as received by receiver 19. One type of comparator would be a balanced push-pull amplifier having the received beacon signal applied to one stage and the locally generated code from coder 36 applied to the other stage. If the codes match, no output from comparator 37 results and the automatic range indicator of this invention stays locked on the particular beacon which is being tracked since it is the one being sought. If, however, the codes do not match, code comparator 31 operates the search relay in relay junction 28, causing gate delay sweep motor 29 to operate gate delay unit 12 in search of another signal. The swept search continues until the correct beacon is received and its identity is further rechecked each time the Morse coded signal is received by receiver 19.

Although there is shown and described only a certain specific embodiment of this invention, the many modifications possible thereof will be readily apparent to those skilled in the art. Therefore, this invention is not to be limited except insofar as is necessitated by the prior art and the spirit of the appended claims.

What is claimed is:

1. An automatic range indicator comprising, means for generating and transmitting a series of interrogating pulses of electromagnetic energy, beacon means responsive to said series of pulses for generating electromagnetic reply signals of a predetermined sequence, means associated with said interrogating means for receiving said reply signals, voltage pulse gating means for activating said receiving means for a predetermined time at a controlled interval after each of said interrogating pulses, means for generating first and second phase-opposed step gating pulses each having a step coinciding with the center of said activating gating pulses, first and second switching means responsive to the combination of said reply signals and said first and second step gating pulses respectively for generating an error signal when any one of said reply signals is displaced from the center of said activating gating pulse, means responsive to said error signal for varying said controlled interval to place said reply signals in the center of said activating gating pulse, and means for measuring said controlled interval to indicate the range between said interrogating means and said beacon.

2. An automatic range indicator comprising, a syncronizer, a transmitter triggered by said synchronizer for transmitting interrogating pulses of electromagnetic energy, an antenna for radiating said interrogating pulses and receiving coded reply signals from beacons responding to said interrogating pulses, a receiver for said reply signals, a voltage pulse gate delay generator triggered by said synchronizer, said gate delay generator including a potentiometer control element, a voltage pulse gate generator coupled to said gate delay generator for activating said receiver, a delay line for delaying the output of said gate delay generator, a voltage pulse step gate generator responsive to said delayed output for producing first and second phase-opposed voltage pulse step gates, first and second switch tubes responsive to the combined amplitudes of said reply signals and said first and second step gates respectively for producing an error signal output, first and second relays responsive to said error signal output, a voltage pulse gate delay sweep motor coupled to said first and second relays for driving the slider arm of said potentiometer of said gate delay generator, a voltmeter connected between said slider arm and one end of said potentiometer for measuring the voltage corresponding to the time delay between each of said interrogating pulses and said reply signals, an integrating circuit responsive to said coded beacon reply signals, a coder coupled to said integrating circuit for generating a selected code of pulses, and a code comparator coupled to said receiver, said coder and said gate delay sweep motor, whereby if said beacon reply signals do not match the selected code said gate delay sweep motor varies the time interval between said interrogating pulses and said activating of said receiver until the correct beacon is received and said voltmeter then registers the range between said transmitter and said beacon.

3. Apparatus for continuously indicating the range to a beacon from an interrogating means in a system of the type in which the interrogating means transmits a series of interrogating pulses and the beacon transmits a series of reply pulses in response thereto, said apparatus comprising, a receiver associated with said interrogating means for receiving said reply pulses, means for activating said receiver for a predetermined period following a controllable interval after each of said interrogating pulses, means for generating first and second phase-opposed gating pulses having leading edges occurring in time coincidence with the mid-point of said predetermined period, means responsive to the combination of said reply pulses and said first and second gating pulses, respectively, for producing an error signal when any one of said reply pulses is displaced from the mid-point of said period, means responsive to said error signal for varying said controllable interval to place said reply signals at the mid-point of said predetermined period, and means for measuring said controllable interval to continuously indicate the range to said beacon.

4. An automatic range indicator comprising, means for transmitting a series of interrogating pulses of electromagnetic energy, a remote beacon responsive to said series of pulses for transmitting reply pulses of a predetermined sequence, means associated with said interrogating means for receiving said series of reply pulses, means for generating a first gating pulse for activating said receiving means for a selected period following a controllable interval after each of said interrogating pulses, means for generating second and third phase-opposed gating pulses having leading edges coinciding with the center of said first gating pulse, means responsive to the combination of said reply signals and said second and third gating pulses, respectively, for generating an error signal when any one of said reply pulses is displaced from the center of said first gating pulse, and means responsive to said error signal for varying said controllable interval to place said reply pulses in the center of said first gating pulse.

5. An automatic range indicator comprising, means for transmitting a series of interrogating pulses of electromagnetic energy, a remote beacon responsive to said series of pulses for transmitting reply pulses of a predetermined sequence, means for receiving said series of reply pulses, means for generating a first gating pulse for activating said receiving means for a predetermined period following a controllable interval after each of said interrogating pulses, means including a delay line for generating second and third phase-opposed gating pulses having leading edges coinciding with the center of said first gating pulse, first and second switching means responsive to the combination of said reply signal and said second and third gating pulses, respectively, for generating an error signal when any one of said reply pulses is displaced from the center of said first gating pulse, means responsive to said error signal for varying said controllable interval to place said reply pulses in the center of said first gating pulse, and means for indicating the duration of said controllable interval.

6. An automatic range indicator comprising, means for transmitting a series of interrogating pulses of energy, a remote beacon responsive to said series of pulses for transmitting reply pulses, means for receiving said reply pulses, means including a potentiometer control element for producing a first gating pulse for activating said receiving means during a predetermined period following a controllable interval after each of said interrogating pulses, means for generating second and third phase-opposed gating pulses having leading edges coinciding with the center of said first gating pulse, means responsive to the combined amplitudes of said reply signals and said second and third gating pulses, respectively, for producing an error signal when any one of said reply pulses is displaced from the center of said first gating pulse, and a motor coupled to said potentiometer control element and responsive to said error signal for varying said controllable interval to place said reply pulses in the center of said first gating pulse.

7. An automatic range indicator for a beacon system comprising, means for transmitting a series of interrogating pulses, a remote beacon responsive to said series of pulses for transmitting a series of reply pulses, a receiver for said reply pulses, means including a potentiometer control element for generating a first gating pulse having a predetermined duration and a leading edge controllably delayed in time from said interrogating pulses for actuating said receiver, means responsive to said first gating pulse for generating second and third phase-opposed gating pulses having leading edges delayed from the leading edge of said first gating pulse by an interval equal to one-half the duration of said first gating pulse, first and second switch tubes responsive to the combined amplitudes of said reply pulses and said second and third gating pulses, respectively, for producing an error signal when any one of said reply pulses is displaced from the center of said first gating pulse, a motor coupled to said potentiometer control element and responsive to said error signal for varying the delay between the leading edge of said first gating pulse and said interrogating pulses to place said reply pulses in the center of said first gating pulse, and means for measuring said controllable delay to indicate the range between said interrogating means and said beacon.

8. Apparatus for continuously indicating the range to a selected beacon from an interrogating transmitter in a system wherein the beacon transmits a coded reply signal in response to interrogating pulses, said apparatus comprising, a receiver associated with said transmitter for receiving said reply signal, means including a potentiometer control element for producing a first gating pulse for activating said receiver for a predetermined period following a controllable interval after each of said interrogating pulses, means including a delay line for generating second and third phase-opposed gating pulses, means responsive to the combined amplitudes of said reply signal and second and third gating pulses, respectively, for producing an error signal when any one of said reply signals is displaced from the center of said first gating pulse, a motor connected to said potentiometer control element and responsive to said error signal for controlling said interval to place said reply signals at the center of said first gating pulse, and a code comparator for comparing said reply signals with a selected code of signals, said code comparator being coupled to said motor to cause said motor to vary said interval until said reply signals match said selected code.

9. Apparatus for continuously indicating the range to a selected beacon from an interrogating transmitter in a system wherein the beacon transmits a coded reply signal in response to interrogating pulses, said apparatus comprising, a receiver associated with said transmitter for receiving said reply signal, means including a potentiometer control element for producing a first gating pulse for activating said receiver for a predetermined period following a controllable interval after each of said interrogating pulses, means including a delay line for generating second and third phase-opposed gating pulses, means responsive to the combined amplitudes of said reply signal and second and third gating pulses, respectively, for producing an error signal when any one of said reply signals is displaced from the center of said first gating pulse, a motor connected to said potentiometer control element and responsive to said error signal for controlling said interval to place said reply signals at the center of said first gating pulse, means for measuring said interval to continuously indicate the range to said beacon, means responsive to said reply signal for generating a selected code of pulses, and a code comparator coupled to said last-mentioned means, said motor and said receiver and being arranged whereby beacon reply signals which do not match the selected code cause said motor to vary said controllable interval until the selected beacon is received and said measuring means indicates the range of said selected beacon.

10. Apparatus for continuously indicating the range to a selected beacon from an interrogating transmitter in a system wherein the beacon transmits a coded reply signal in response to interrogating pulses, said apparatus comprising, a receiver associated with said transmitter for receiving said reply signal, means including a potentiometer control element for producing a first gating pulse for activating said receiver for a predetermined period following a controllable interval after each of said interrogating pulses, means including a delay line for generating second and third phase-opposed gating pulses, means responsive to the combined amplitudes of said reply signal and second and third gating pulses, respectively, for producing an error signal when any one of said reply signals is displaced from the center of said first gating pulse, a motor connected to said potentiometer control element and responsive to said error signal for controlling said interval to place said reply signals at the center of said first gating pulse, means coupled to said receiver and said motor and arranged whereby beacon reply signals which are of a different code than that from said selected beacon cause said motor to vary said interval until signals from said selected beacon are received and positioned at the center of said first gating pulse, and means coupled to said potentiometer for measuring said controllable interval, said interval being a measure of the range to said selected beacon.

GEORGE D. PERKINS.

(References on following page)

References Cited in the file of this patent

UNITED STATES PATENTS

| Number | Name | Date |
|---|---|---|
| 2,134,716 | Gunn | Nov. 1, 1938 |
| 2,403,527 | Hershberger | July 9, 1946 |
| 2,403,626 | Wolff et al. | July 9, 1946 |
| 2,403,975 | Graham | July 16, 1946 |
| 2,405,238 | Seeley | Aug. 6, 1946 |
| 2,405,239 | Seeley | Aug. 6, 1946 |
| 2,421,018 | Rosa | May 27, 1947 |
| 2,455,265 | Norgaard | Nov. 30, 1948 |
| 2,459,811 | Grieg | Jan. 25, 1949 |
| 2,471,373 | Joyner | Mar. 24, 1949 |
| 2,482,544 | Jacobsen | Sept. 20, 1949 |
| 2,483,594 | Oliver | Oct. 4, 1949 |
| 2,495,753 | Mozley | Jan. 31, 1950 |
| 2,515,178 | Barchok | July 18, 1950 |
| 2,531,412 | Deloraine | Nov. 28, 1950 |
| 2,540,087 | Barchok et al. | Feb. 6, 1951 |
| 2,543,072 | Stearns | Feb. 27, 1951 |